United States Patent

[11] 3,578,211

| [72] | Inventors | Richard T. Coapman;<br>Gary D. Ginther, Troy, Mich. |
|---|---|---|
| [21] | Appl. No. | 788,270 |
| [22] | Filed | Dec. 31, 1968 |
| [45] | Patented | May 11, 1971 |
| [73] | Assignee | Clyde Corporation<br>Troy, Mich. |

[54] LOADER FOR RECIPROCATING HOPPER
25 Claims, 6 Drawing Figs.

[52] U.S. Cl. .................................................. 222/56,
222/166, 221/10
[51] Int. Cl. .................................................. B67d 5/08
[50] Field of Search ......................................... 222/160,
164, 166, 56; 221/156—173, 10

[56] References Cited
UNITED STATES PATENTS

| 891,094 | 6/1908 | Peirce | 222/166X |
| 2,353,541 | 7/1944 | Bokum et al. | 222/56 |
| 2,433,560 | 12/1947 | Hurleg, Jr. | 222/56 |
| 2,763,400 | 9/1956 | Francis | 222/56 |
| 3,110,420 | 11/1963 | Brewer | 222/56 |
| 3,212,671 | 10/1965 | Rock | 222/56 |
| 3,237,807 | 3/1966 | Garvey | 222/56 |
| 3,346,143 | 10/1967 | Haberstump | 221/10X |

*Primary Examiner*—Samuel F. Coleman
*Attorney*—Barnes, Kisselle, Raisch & Choate ABSTRACT: A flexible band forms a chute by which articles are delivered to a vertically oscillating hopper from an elevated container while the hopper is in motion. A spring-supported pressure plate within the hopper is depressed by impacts of the articles within the hopper thereon only until the supply falls below a predetermined minimum and thereafter remains undepressed, thereby actuating a motor which causes transfer of additional articles from the elevated container onto the chute for automatically replenishing the supply of articles in the hopper.

Patented May 11, 1971

INVENTORS
RICHARD T. COAPMAN
GARY D. GINTHER
BY
Barnes, Kisselle, Raisch & Choate
ATTORNEYS

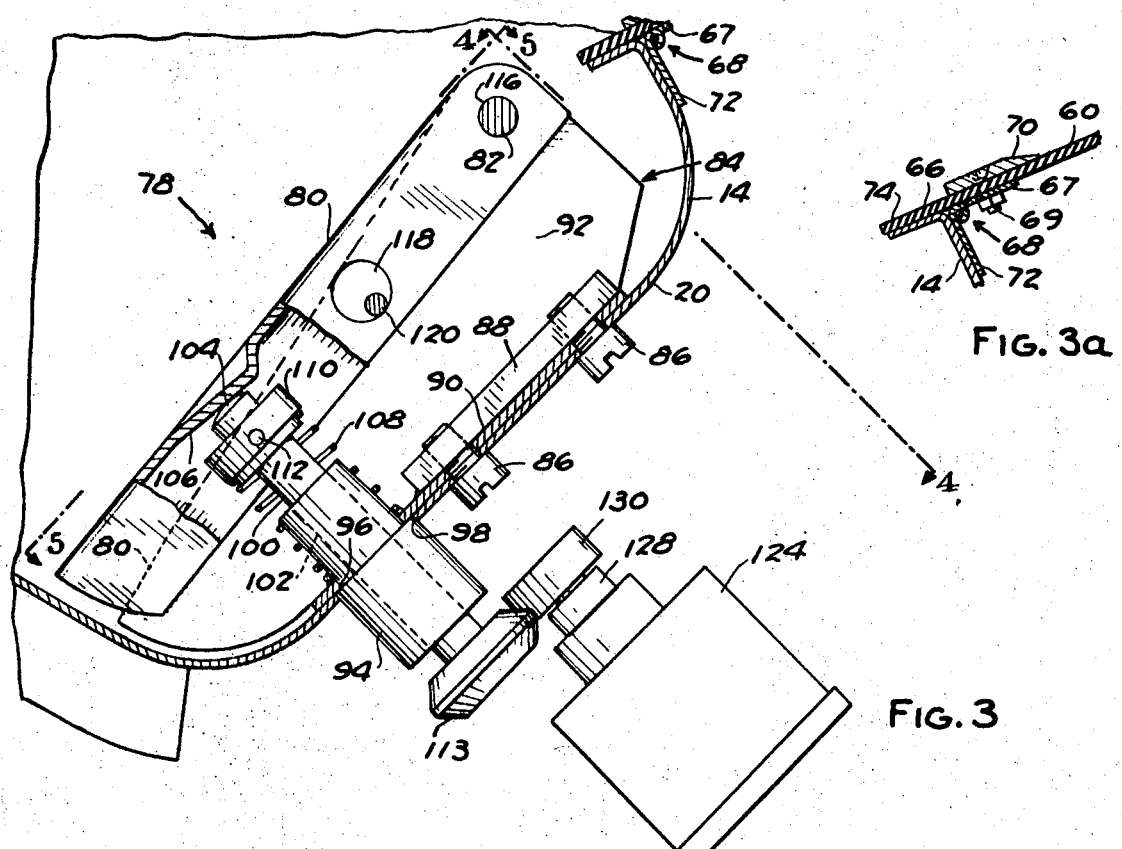
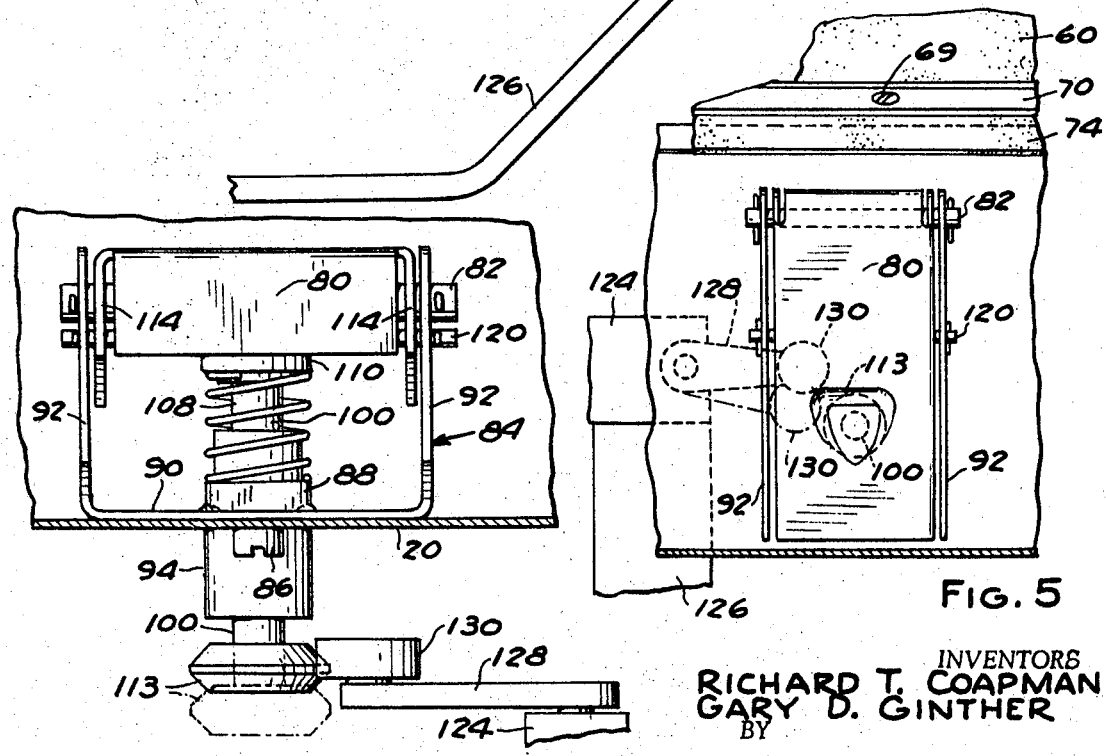
INVENTORS
RICHARD T. COAPMAN
GARY D. GINTHER
BY
Barnes, Kisselle, Raisch & Choate
ATTORNEYS

LOADER FOR RECIPROCATING HOPPER

This invention relates in general to hoppers of the type which oscillate in a vertical direction to feed a succession of articles in a predetermined orientation to an exterior stationary track. An example of such a hopper is disclosed in U.S. Pat. No. 3,026,000. More particularly, the invention relates to a loader which automatically replenishes the supply of articles in the hopper when the supply reaches a generally predetermined minimum and while the hopper is in motion.

Conventionally, an attendant manually fills the hopper with articles while it is stationary and in a downward position. Thereafter, the attendant inspects the hopper periodically during its operation; and when he see that the supply of articles therein is getting low, he stops the hopper in its downward position, manually replenishes the supply, and restarts the hopper.

Thus, the conventional hopper requires continuing, though periodic, attention of a human attendant, which often gives rise to inefficiency in use of the attendant's time, as when he must interrupt other work to check the hopper. Moreover, should the attendant forget or for other reasons fail to replenish the hopper, its supply of articles becomes exhausted, which may result in costly downtime for machinery or equipment to which the articles are fed by the hopper. The latter situation is particularly objectionable when the hopper is incorporated, for example, into an automated production line.

The object of this invention is to provide a relatively simple, inexpensive loader improved to load and automatically replenish the supply of articles in a hopper when the supply diminishes to a generally predetermined minimum and while the hopper continues to oscillate.

In general, the invention is carried out by providing a flexible chute between the hopper and an elevated container for the articles. The chute follows movement of the hopper as it oscillates. A sensing device in the hopper is subject to impacts of the mass of articles therein as the hopper oscillates. When the supply of articles diminishes to a generally predetermined minimum, the sensing device senses the resulting diminution of the magnitude of the impacts and actuates a motor which causes a fresh supply of articles to be transferred from the elevated container onto the flexible chute from which they pass gravitationally into the hopper.

One form of the invention is shown in the accompanying drawing.

FIG. 3 is an enlarged scale fragmentary view partly in elevation and partly in section illustrating structural details of a sensing device.

FIG. 3a is a fragmentary view similar to FIG. 3 showing certain additional structural details.

FIG. 4 is a sectional view on line 4—4 of FIG. 3.

FIG. 5 is a reduced scale view on line 5—5 of FIG. 3.

Figures 1, 2:
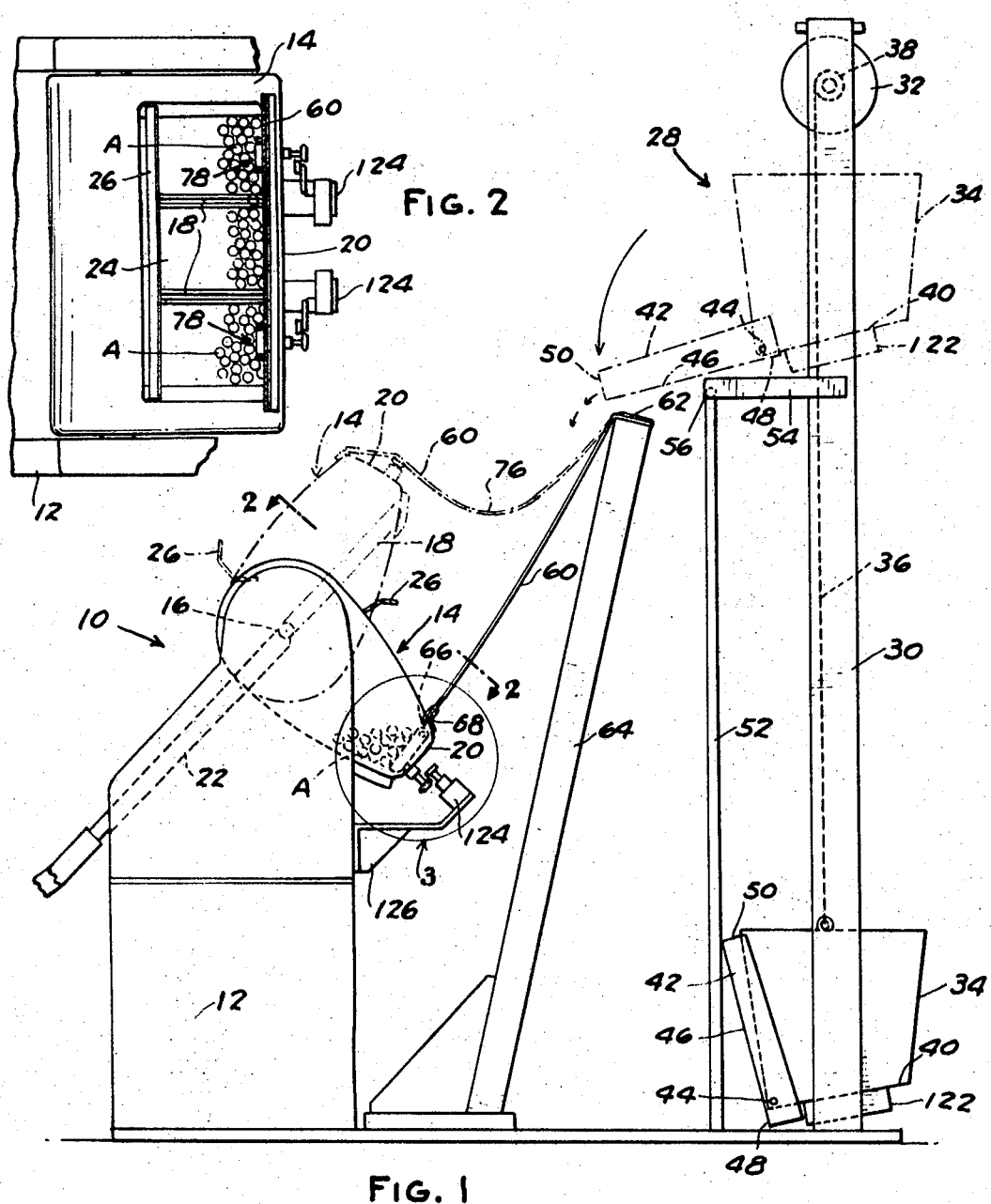
FIG. 1 is a partly diagrammatic, generally elevational view of a hopper and loader combination which incorporates the present invention.
FIG. 2 is a view partly in plan and partly in section taken on line 2—2 of FIG. 1.

Shown in the drawings is a hopper 10 comprising a base 12 which supports a hopper body 14. The hopper body oscillates between downward and upward positions illustrated respectively in solid and broken lines (FIG. 1) about a pivot 16. As is disclosed in greater detail in the patent referred to above, a track 18 is mounted within and oscillates with hopper body 14. Upon each downward movement of the hopper body, the articles A therein amass adjacent an end portion 20 thereof; and upon each upward movement, those articles which are properly oriented are retained by the track while the remaining articles fall off of the track and return to the bottom of the hopper. The hopper structure includes a substantially stationary track 22 external of hopper body 14. Tracks 18 and 22 adjoin adjacent pivot 16 when hopper body 14 is in the upward, dotted-line position of FIG. 1. The articles in track 18 thereupon slide out of the hopper body and onto track 22 for delivery in properly oriented position to other machinery or equipment. The hopper 10 illustrated herein has two internal tracks 18 and two corresponding external tracks 22.

Hopper body 14 has an opening 24 through which articles A are loaded into the hopper body. A deflector 26 is mounted across the portion of opening 24 which is nearest pivot 16 in the upward, dotted-line position of hopper body 14. This deflector serves a purpose described below.

The loading apparatus for hopper 10 includes an elevator 28 having an upright stanchion 30. A motor 32 of any suitable type is mounted adjacent the top of stanchion 30, and this motor is used to raise and lower a container 34 for parts A. Motor 32 is operatively connected to container 34 by means of a cable 36 and drum 38. Container 34 has sloped bottom 40 and an outlet opening (not shown) which, in the lower solid-line position of the container, is closed by a chute 42 hinged adjacent the container bottom at 44.

Chute 42 has a bottom 46 including a portion 48 adjacent hinge 44. The chute has an outlet end 50. Chute 42 is canted outwardly and is retained in its upward, solid-line position of FIG. 1 by engagement of its outlet end against a pair of horizontally spaced upright rails 52. The upper ends of the rails are secured to stanchion 30 by braces 54, and a horizontal crossbar 56 extends between the upper ends of the rails.

When container 34 is elevated, chute 42 clears rails 52 and crossbar 56 and thereupon swings gravitationally outwardly and downwardly until its movement is halted by engagement of bottom portion 48 of the chute beneath bottom 40 of container 34, as shown in dotted lines in FIG. 1. In this position, bottom 46 of chute 42 is generally in sloped extension of container bottom 40.

Articles A are transferred from chute 42 into hopper opening 24 by means of a flexible chute 60 which may comprise simply a band of flexible material. Band 60 has an upper end portion 62 which is supported adjacent chute outlet 50 by such means as an upright 64. The other end portion 66 of the band is secured to hopper body 14 adjacent opening 24. In the apparatus illustrated, end 66 is anchored to one member 67 of a hinge 68 by screws 69 and a fastening strip 70, the other hinge member 72 being fastened to hopper body 14.

As will be seen from FIG. 1, hopper body 14 oscillates through a relatively wide angle, typically somewhat greater than 90°, and the hinging action of hinge members 67, 72 makes it unnecessary to flex lower end portion 66 of band 60 thereby protecting the band against wear at that location. In this regard, if lower end portion 66 is extended beyond hinge 68 as at 74 (FIG. 3a), it is unnecessary to fasten such extension to the hopper body.

As shown in FIG. 1, end portion 20 of the hopper body is closer to chute outlet 50 in upward position than in downward position of the hopper body. This results in the formation in band 60 of a loop or basin 76 in upward position of the hopper body for a purpose to be described.

A sensing device 78 is mounted within hopper body 14 adjacent end 20. This device senses the level of supply in the hopper body and forms one element of an apparatus for actuating a motor which causes the supply of articles to be replenished when required. In the illustrated form of the invention, sensing device 78 includes a pressure plate 80 pivotally mounted at 82 on a U-shaped bracket 84 secured to end portion 20 of the hopper body by such means as bolts 86 threaded through an elongate nut plate 88 disposed within the base 90 of bracket 84. Bracket sides 92 provide shields which exclude articles A from the space between pressure plate 80 and bracket bottom 90.

A bushing 94 is secured within an opening 96 in bracket bottom 90 (FIG. 3), and this bushing projects through an aligned opening 98 in end portion 20 of hopper body 14. A plunger 100 extends slidably through a center opening 102 in bushing 94. Plunger 100 has an inner end portion 104 which is biased into engagement with the underside 106 of pressure plate 80 by means of a coil spring 108 compressed between bracket bottom 90 and a collar 110 pinned onto the plunger at 112. Plunger 100 extends to the exterior of end portion 20 of the hopper body and a head 113 is provided at the outer end of the plunger for a purpose to be described.

Pressure plate 80 has downwardly projecting side portions 114 with openings 116 through which pivot 82 extends. Sides 114 are also provided with aligned relatively large diameter openings 118 and a small diameter pin 120 mounted on bracket legs 92 passes through these openings. The clearance between openings 118 and pin 120 facilitates swinging of pressure plate 80 about pivot 82 downwardly from the solid-line position of FIG. 3 to the dotted-line position. Pin 120 provides a stop which prevents plate 80 from swinging upwardly under the action of spring 108 beyond the solid-line position of FIG. 3.

Container 34 and chute 42 in its downward position may be viewed collectively as a single container from which articles A are periodically furnished to hopper body 14. The slope of the bottom wall 40, 46 of this composite container is small enough so that even with chute 42 in its downward position articles A do not travel gravitationally through outlet 50 onto flexible band 60. Motor means are required to effect transfer of the articles from the container onto the band. Conveniently and inexpensively, this motor means comprises simply a conventional vibratory electric motor 122 mounted on the bottom of container 34. Vibrations of this motor are transmitted from container 34 to chute 42. When the motor is in operation, articles in the composite container migrate downwardly and pass through opening 50 onto band 60. When the motor is turned off, such migration stops.

A control switch 124 for motor 122 is mounted on a bracket 126 affixed to hopper base 12. Switch 124 is provided with a control lever or toggle 128 having a roller 130 at its end positioned for engagement by plunger head 113 under certain conditions described below.

In use, it may be assumed that hopper body 14 has been filled to its proper level with articles A and that the hopper is in operation with its body oscillating between the upward and downward positions of FIG. 1 so that a train of properly oriented parts is fed from each internal track 18 to an external track 22. Container 34 has been filled with articles A and motor 32 has been actuated to elevate container 34 to its upward dotted-line position; hinged chute 42 has swung downwardly and its outlet 50 projects over chute 60. Vibratory motor 122 is turned off, and no articles A are being discharged from container opening 50 onto band 60.

Each time that hopper body 14 moves downwardly to the solid-line position of FIG. 1, the mass of articles A therein slides downwardly and strikes or impinges against pressure plate 80. So long as the supply of articles in the hopper body is adequate, the magnitude of the impact of the articles against the pressure plate is great enough to swing the pressure plate downwardly from the solid-line to the dotted-line position thereof shown in FIG. 3 against the action of spring 108. This causes plunger 100 to move downwardly or outwardly of the hopper body and causes head 113 on the plunger to shift from the solid-line position of FIGS. 3 and 4 to the dotted-line position of FIG. 4. In this position, head 113 moves in a path which is clear of the roller on switch toggle 128. Head 113 thus moves past roller 130 without tripping switch 124, and motor 122 remains deactuated.

As the supply of articles in the hopper body is used up, the impact of the articles against pressure plate 80 diminishes gradually. The biasing force of spring 108 and the length and area of plate 80 are so correlated that when the magnitude of impact of articles against the plate diminishes to a generally predetermined point, spring 108 will support the pressure plate in the solid-line position of FIG. 3 against such impacts. Thus when the level of supply reaches generally its predetermined minimum, spring 108 prevents pressure plate 80 and plunger head 113 from shifting to the dotted-line position of FIG. 4 upon downward swinging of the hopper body.

When this situation occurs, plunger head 113, remaining in its solid-line position, moves in a path in which it will engage roller 130 and swing switch lever 128 to trip switch 124. The switch closes electrical circuitry (not shown) which actuates vibratory motor 122. Container bottom 40, 46 is vibrated; and articles A migrate downwardly thereon and discharge through outlet 50 onto flexible chute 60. When hopper body 14 is in its downward position, the articles thereon simply slide gravitationally downwardly into opening 24. When the hopper body is in its upward position, the articles slide downwardly into basin 76 where they are contained until the hopper body moves downwardly sufficiently to permit the articles to slide down the chute into opening 24. As shown in dotted lines in FIG. 1, chute 42 remains out of contact with upright 64 so that it is free to vibrate under the influence of motor 122.

The circuitry to motor 122 preferably includes a conventional timer which holds the electrical circuit closed for a predetermined interval after tripping of switch 124. If, at the end of this interval, the supply of articles in the hopper body has been adequately replenished, impacts thereof against plate 80 will shift plunger head 113 outwardly to its dotted-line position wherein it will clear roller 130 and leave motor 122 deactuated. On the other hand, if at the end of the first timed interval the supply of parts has not been sufficiently replenished, plunger head 113 will be left in a position to engage roller 130 and reactuate motor 122 for another interval of time. The process repeats for as long as required to replenish the supply of articles in the hopper, and it occurs each time that the supply of articles is diminished to the generally predetermined minimum.

To replenish the supply of articles in container 34, suitable controls which may be manual are operated to actuate hoist motor 32 to lower container 34 and after it has been refilled, motor 32 is again actuated to elevate container 34 to its upward position.

In order to prevent articles on band 60 from falling off of the free edges thereof, the width of chute outlet 50 is made considerably narrower than the width of the band, this width dimension being in the direction perpendicular to the plane of FIG. 1. This width differential will vary depending upon the nature of the articles being fed, but as a general proposition, band 60 may be about twice as wide as outlet 50.

The material of band 60 may vary with the nature of the articles with which the apparatus is used. For example, if the articles are of metal, a Neoprene-coated fabric is usually satisfactory. If the parts are of plastic, an uncoated cloth fabric is generally satisfactory.

In relatively small hoppers, a single sensing device 78 is adequate. In larger dual or multiple-track hoppers such as illustrated in FIG. 2, a plurality of sensing devices 78 and switches 124 may be used. In such an arrangement, it is usually desirable to arrange the circuitry for motor 122 so that the motor is actuated should either or any one of the sensing devices sense a minimum level of supply of parts in the hopper.

Occasionally, an article received by band 60 while the hopper is moving upwardly comes to rest adjacent hopper opening 24. Then when the hopper body reaches its fully upward position, the article instead of falling into opening 24 may "overshoot" the opening. Deflector 26 catches the article and prevents it from falling onto external track 22 where it might otherwise become lodged in an improperly oriented position. Then when the hopper body moves downwardly, deflector 26 channels the article back into the hopper opening and away from the area of pivot to prevent the article from becoming jammed or otherwise interfering with the relatively articulating tracks 18 and 22 or other devices frequently provided in that region.

The invention thus provides a relatively simple, inexpensive, foolproof apparatus for automatically replenishing the supply of articles in an oscillating hopper regardless of the position of the hopper body and while the hopper body continues to oscillate. The necessity for frequent inspections by an attendant to determine the level of supply of articles in the hopper body is eliminated. Elevator container 34 can easily be made large enough to keep a hopper supplied throughout a full day's operation.

We claim:

1. In combination with a hopper oscillatable between a downward position for amassing articles in a portion thereof and an upward position for delivering articles therefrom, apparatus for maintaining the supply of articles in said hopper above a predetermined minimum which comprises, a container disposed at a location higher than said hopper and adapted to contain a quantity of said articles, means forming a chute mounted for conveying articles gravitationally from said container to said hopper, said chute being flexible to follow reciprocating movement of said hopper, sensing means effective to sense diminution of the supply of articles in said hopper to said minimum, motor means operable upon actuation to effect transfer of articles in said container to said chute, and means including said sensing means operable to actuate said motor means responsive to said sensing of said diminution, said container having an outlet and said hopper having an inlet, said chute comprising a band of flexible material extending from said outlet to said inlet, said band having a length at least as great as the distance between said outlet and inlet in downward position of said hopper, said outlet and inlet being closer together in upward position of said hopper than in downward position thereof so that in said upward position said band forms a basin for containing articles transferred thereto while said hopper is in said upward position.

2. The combination defined in claim 1 wherein said sensing means includes means exposed to the dynamic action of articles in said hopper upon oscillation thereof and being effective to sense diminution of said action attendant to diminution of said supply to said minimum.

3. The combination defined in claim 2 wherein said exposed means is positioned adjacent an end portion of said hopper so that the mass of articles in said hopper impinges the same upon downward movement of said hopper.

4. The combination defined in claim 3 wherein said exposed means is mounted for movement relative to the interior of said hopper responsive to impingement thereon of said mass, and means yieldably resisting said movement with a force generally equivalent to the impingement force of said minimum supply against said exposed means.

5. The combination defined in claim 4 wherein said exposed means comprises a plate and said yieldable means comprises spring means operatively interposed between said plate and end portion of said hopper.

6. The combination defined in claim 5 and including in addition means effective to limit movement of said plate away from said end portion under the force of said spring means.

7. The combination defined in claim 5 wherein said plate and spring means are mounted within said hopper, and said spring means is disposed between said plate and end portion, and means forming a shield which excludes articles in said hopper from between said plate and end portion.

8. The combination defined in claim 7 wherein said plate is pivotally mounted on said means forming said shield.

9. The combination defined in claim 8 and including in addition means on said shield and plate cooperable to limit movement of said plate away from said end portion under the force of said spring means.

10. In combination with a hopper oscillatable between a downward position for amassing articles in a portion thereof and an upward position for delivering articles therefrom, apparatus for maintaining the supply of articles in said hopper above a predetermined minimum which comprises, a container disposed at a location higher than said hopper and adapted to contain a quantity of said articles, means forming a chute mounted for conveying articles gravitationally from said container to said hopper, said chute being flexible to follow reciprocating movement of said hopper, sensing means effective to sense diminution of the supply of articles in said hopper to said minimum, motor means operable upon actuation to effect transfer of articles in said container to said chute, and means including said sensing means operable to actuate said motor means responsive to said sensing of said diminution, said sensing means comprising a plate pivotally mounted on support means within said hopper and being positioned adjacent an end portion of said hopper so that the mass of articles in said hopper impinges said plate upon downward movement of said hopper, spring means disposed between said plate and end portion yieldably resisting impingement-induced movement of said plate with a force generally equivalent to the impingement force of said minimum supply against said plate, said support means forming a shield which excludes particles in said hopper from between said plate and end portion, means on said shield and plate cooperable to limit movement of said plate away from said end portion under the force of said spring means, and means forming a plunger mounted on said hopper for movement in response to movement of said plate, said plunger having a portion which extends to the exterior of said hopper and which forms an element of said means operable to actuate said motor.

11. The combination defined in claim 10 wherein the exterior portion of said plunger is provided with means forming a trip member which, upon oscillation of said hopper adjacent its downward position, moves in one path when said plate is so moved by said mass and which moves in another path when said plate is not so moved, said means operable to actuate said motor means including another element positioned for operative engagement by said trip member in one of said paths only.

12. The combination defined in claim 11 wherein said motor means is electrically powered and said other element comprises an electrical switch in the circuit for the electric motor.

13. The combination defined in claim 12 wherein said motor means comprises a vibratory electrical motor mounted on said container.

14. The combination defined in claim 4 and including in addition trip means movable from a first position to a second position responsive to impingement-induced movement of said exposed means, said trip means upon oscillation of said hopper having first and second paths of movement in said first and second positions respectively, and motor-actuating means including an element mounted in one of said paths of movement for engagement by said trip means and being displaced from the other path of movement.

15. The combination defined in claim 14 wherein said element is mounted in said second path of movement.

16. The combination defined in claim 4 wherein said motor means is electrically powered, said motor-actuating means comprising electrical circuitry and switch means operated responsive to movement of said exposed means.

17. The combination defined in claim 16, wherein said motor means comprises a vibratory electrical motor mounted on said container.

18. In combination with a hopper oscillatable between a downward position for amassing articles in a portion thereof and an upward position for delivering articles therefrom, apparatus for maintaining the supply of articles in said hopper above a predetermined minimum which comprises, a container disposed at a location higher than said hopper and adapted to contain a quantity of said articles, means forming a chute mounted for conveying articles gravitationally from said container to said hopper, said chute being flexible to follow reciprocating movement of said hopper, sensing means effective to sense diminution of the supply of articles in said hopper to said minimum, motor means operable upon actuation to effect transfer of articles in said container to said chute, and means including said sensing means operable to actuate said motor means responsive to said sensing of said diminution, said sensing means including exposed means positioned adjacent an end portion of said hopper and mounted for movement relative to the interior of said hopper responsive to impingement thereon of the mass of articles in said hopper upon downward movement of said hopper, means yieldably resisting said movement with a force generally equivalent to the impingement force of said minimum supply against said exposed means, trip means movable from a first to a second position responsive to impingement-induced movement of said exposed means, said trip means upon oscillation of said hopper having first and second paths of movement in said first and second positions respectively, motor-actuating means including an element mounted in one of said paths of movement for engagement by said trip means and being displaced from the other path of movement, said trip means having means projecting laterally of its direction of movement, said laterally projecting means being so engageable with said element.

19. The combination defined in claim 18 wherein said member is movable with said exposed means.

20. The combination defined in claim 1 wherein said band has a width greater than the width of said outlet.

21. The combination defined in claim 20 wherein the width of said band is about twice the width of said outlet.

22. The combination defined in claim 1 wherein said band has an upper end portion secured to a substantially stationary support adjacent said outlet and a lower end portion secured to said hopper adjacent said inlet.

23. The combination defined in claim 22 wherein said lower end portion is secured to one member of a hinge, the other member of which is secured to said hopper.

24. The combination defined in claim 1 wherein said band has an upper end portion secured to a substantially stationary support adjacent said outlet and a lower end portion secured to said hopper adjacent said inlet, said band having free edge portions spaced laterally outwardly of said outlet and throughout its length between said outlet and inlet having a width between said edge portions which is greater than that of said outlet, whereby to contain articles on said band from falling off of said free edge portions.

25. The combination defined in claim 1 wherein said hopper is provided with internal track means which oscillate therewith and substantially stationary external track means to which similarly oriented articles are directed by said internal track means in upward position of said hopper, a deflector being mounted on said hopper adjacent said inlet, said deflector being positioned and contoured to contain articles which overshoot said inlet and to channel said articles into said inlet and away from the location where said internal and external track means adjoin.